3,551,504
PREPARATION OF ALCOHOLS
Louis Schmerling, Riverside, and Robert A. Dombro, Chicago, Ill., assignors to Universal Oil Products Company, Des Plaines, Ill., a corporation of Delaware
No Drawing. Filed Sept. 18, 1967, Ser. No. 668,693
Int. Cl. C07c 31/02, 141/04
U.S. Cl. 260—632                                                                 9 Claims

ABSTRACT OF THE DISCLOSURE

A primary, secondary, or tertiary alcohol may be prepared by the hydrolysis of a hydrocarbonsulfonic acid or salt thereof at elevated temperatures using an alcoholic alkali medium.

This invention relates to a process for preparing alcohols and particularly to a process for preparing primary and secondary and tertiary alcohols utilizing a hydrocarbon-sulfonic acid as the starting material.

Alcohols, whether they be primary, secondary, or tertiary in nature are important intermediates in the preparation of many chemical compounds. These alcohols may be aliphatic alcohols or cycloaliphatic alcohols in configuration. For example, primary alcohols, and particularly those which contain a relatively long carbon chain such as from 10 to about 16 carbon atoms in length are utilized as intermediates in the preparation of synthetic detergents. A normal primary alcohol such as n-dodecyl alcohol, n-tetradecyl alcohol, or n-hexadecyl alcohol may be condensed with benzene and thereafter treated with sulfuric acid and an alkali to make the sodium sulfonate salt thereof. The resulting detergent will be biodegradable in nature and therefore will find wide commercial acceptance inasmuch as there exists a current problem of unwanted foam and suds in many rivers, streams, lakes, etc. which act as a water supply for many towns and cities. The presence of this unwanted foam is due, in many instances, to the use of detergents which are non-biodegradable in nature and which will not break down by bacterial action thereon. The non-biodegradable nature of these detergents is due to the fact that the alkyl side chain of the molecule is, in many instances, highly branched and therefore the organism which would ordinarily destroy the molecule cannot do so. In contradistinction to this, the use of straight-chain alkyl substituents on the ring will permit the detergents to be destroyed and therefore foam will not build up on the surface of the water. Other uses for alcohols will be as solvents, such as benzyl alcohol which is used as a solvent in perfumery and flavoring materials. Alcohols may also be used as intermediates in manufacturing high-boiling esters, as anti-foaming agents, as intermediates in the manufacturing of plasticizers, wetting agents, hydraulic oils, petroleum additives, agricultural chemicals, anticeptics and other uses too numerous to mention at this time.

Heretofore, the prior art has disclosed the reaction of alkanesulfonic acids at elevated temperatures in aqueous alkali solutions. Three reactions were postulated as to what should occur when a sodium alkanesulfonate was heated with aqueous sodium hydroxide. These reactions are as follows:

(1) $RCH_2CH_2SO_3Na + NaOH \rightarrow RCH=CH_2 + NaHSO_3$ (2) $RCH_2CH_2SO_3Na + NaOH \rightarrow RCH_2CH_3 + Na_2SO_4$ (3) $RCH_2CH_2SO_3Na + NaOH \rightarrow RCH_2CH_2OH + Na_2SO_3$ It is reported in the prior art that when n-alkanesulfonates ranging from methane to hexane sulfonate were heated with aqueous sodium hydroxide at a temperature ranging from about 317° to about 375° C. neither olefin nor alcohol was obtained. In addition, acidification of the solutions resulting from sodium butane- and pentanesulfonates gave odors of butyric and valeric acids which were not isolated. Subsequently it was reported that repetition of this prior art reaction showed that the action of aqueous sodium hydroxide on the alkanesulfonates at 350° C. results exclusively in a bimolecular β-elimination reaction with the formation of the olefin, that is Equation 1 above; the first investigator had evidently overlooked the olefin due to his method of analysis of the product. However, in contradistinction to the reported results set forth in the prior art, we have now discovered that the utilization of an alcoholic alkali medium in the hydrolysis of an alkanesulfonic acid will result in the formation of an alcohol, rather than an olefin, as the chief component of the reaction product.

It is therefore an object of this invention to provide a process for preparing alcohols.

A further object of this invention is to provide a process for preparing alcohols utilizing a hydrocarbonsulfonic acid as the starting material.

Therefore, in one aspect, an embodiment of this invention resides in a process for the preparation of an alcohol which comprises subjecting a hydrocarbonsulfonic acid or an alkali, alkaline earth or Group III metal salt thereof to hydrolysis in an alcoholic alkali medium at hydrolysis conditions, and recovering the resultant alcohol.

A specific embodiment of this invention is found in a process for the preparation of an alcohol which comprises subjecting sodium dodecanesulfonate to hydrolysis at a temperature in the range of from about 100° to about 300° C. in the presence of an ethyl alcoholic sodium hydroxide medium and recovering the resultant n-dodecyl alcohol.

Other objects and embodiments will be found in the following further detailed description of the present invention.

As hereinbefore set forth the present invention is concerned with a process for preparing alcohols utilizing a sulfonic acid as the starting material. The alcohol is prepared by subjecting the aforementioned hydrocarbonsulfonic acid to hydrolysis in the presence of an alcoholic alkali medium at elevated temperatures ranging from about 100° up to about 300° C. In addition, it is also contemplated that the hydrolysis conditions will include pressures of about atmospheric. However, if so desired, superatmospheric pressures ranging from 2 to about 50 atmospheres or more may be used, said pressure being the pressure generated by the reactants at the reaction temperature or that effected by the introduction of a substantially inert gas such as nitrogen into the reaction vessel. The superatmospheric pressures are used only when relatively high reaction temperatures are employed, the purpose of the pressure being to maintain a major portion of the reactants in a liquid phase.

Examples of hydrocarbonsulfonic acids which are utilized as the starting material in the process of this invention include in particular the saturated hydrocarbonsulfonic acids (alkane-, cycloalkane- and aralkanesulfonic acids) and alkali, alkaline earth or Group III metal salts thereof. Specific examples of these compounds will include methanesulfonic acid, ethanesulfonic acid, 1-propanesulfonic acid, 2-propanesulfonic acid, butanesulfonic acid, dodecanesulfonic acid, phenylmethanesulfonic acid, cyclopentanesulfonic acid, cyclohexanesulfonic acid, sodium methanesulfonate, sodium ethanesulfonate, sodium propanesulfonates, sodium butanesulfonates, sodium pentanesulfonates, sodium hexanesulfonates, sodium heptanesulfonates, sodium octanesulfonates, sodium nonanesulfonates, sodium decanesulfonates, sodium dodecanesulfonates, sodium phenylmethanesulfonate, sodium cyclopentanesulfonate, sodium cyclohexanesulfonate, potassium methanesulfonate, potassium ethanesulfonate, potassium propanesulfonates, potassium butanesulfonates, potassium pentanesulfonates, potassium hexanesulfonates, potassium heptanesulfonates, potassium octanesulfonates, potassium nonanesulfonates, potassium decanesulfonates, potassium undecanesulfonates, potassium dodecanesulfonates, potassium phenylmethanesulfonate, potassium cyclopentanesulfonate, potassium cyclohexanesulfonate, calcium methanesulfonate, calcium ethanesulfonate, calcium propanesulfonates, calcium butanesulfonates, calcium pentanesulfonates, calcium hexanesulfonates, calcium heptanesulfonates, calcium octanesulfonates, calcium nonanesulfonates, calcium decanesulfonates, calcium undecanesulfonates, calcium dodecanesulfonates, calcium phenylmethanesulfonate, calcium cyclopentanesulfonate, calcium cyclohexanesulfonate, etc. In general, compounds in which the sulfur is attached to a primary or secondary carbon atom are the preferred sulfonic acids or salts. It is to be understood that the aforementioned substituted sulfur containing compounds are only representatives of the class of compounds which may undergo hydrolysis in an alcoholic alkali medium, and that the present invention is not necessarily limited thereto. Aromatic sulfonic acids may also be considered within the scope of this reaction but not necessarily with equivalent results.

It is also contemplated within the scope of this invention that hydrocarbonsulfinic and hydrocarbonsulfenic acids and salts thereof which are similar in configuration to the aforementioned hydrocarbonsulfonic acids and salts thereof may also be used in the present invention. However, the hydrocarbonsulfonic acid or salts thereof constitute the preferred reactants inasmuch as these compounds are more readily available and correspondingly more inexpensive than are the hydrocarbonsulfenic and hydrocarbonsulfinic acids and salts thereof.

The alcoholic alkali medium in which the process of this invention is effected comprises a mixture of an alcohol, water and an alkali compound such as sodium hydroxide, lithium hydroxide, rubidium hydroxide, cesium hydroxide, magnesium hydroxide, calcium hydroxide, strontium hydroxide, etc., the hydroxides being present in the mixture in an amount in the range of from about 10 wt. percent up to about 70 wt. percent; in general, hydroxides which are soluble in alcohol or aqueous alcohol are preferred. The alcoholic portion of the medium is provided for by the presence of methyl alcohol, ethyl alcohol, n-propyl alcohol, isopropyl alcohol, butyl alcohol, etc., the preferred alcohol being ethyl alcohol. The alcohol may contain up to about 50% of water, water being particularly useful in causing more rapid and complete solution of the hydroxide.

The process of this invention may be effected in any suitable manner and may comprise either a batch or continuous type operation. For example, when a batch type operation is used, a quantity of the sulfonic acid or salt thereof is placed in an appropriate reaction apparatus. The alcoholic or aqueous-alcoholic alkali medium is also added to the reaction vessel which is thereafter heated to the desired operating temperature. The reaction is allowed to proceed at the desired temperature for a predetermined period of time which may range from about 0.5 up to about 10 hours or more. In addition, if so desired, when utilizing an apparatus such as a rotating autoclave, the reaction may be effected under a pressure which is provided for by the introduction of an inert gas such as nitrogen to the reaction apparatus. Upon completion of the desired residence time the apparatus and contents thereof are allowed to cool to room temperature. In the event that the reaction has been run under superatmospheric pressure any excess pressure that may be present is vented and the reaction mixture is recovered. The reaction product is then treated in a conventional manner such as fractional distillation, crystallization or other separation means whereby the desired alcohol which may be primary, secondary, or tertiary in nature is recovered from the reaction mixture, the latter comprising unreacted sulfur containing compounds, by-product and alcoholic alkali medium.

It is also contemplated within the scope of this invention that the process may be effected in a continual manner. The sulfonic acid or salt thereof is continuously charged to a reaction vessel which is maintained at the proper operating conditions of temperature and pressure. The alcoholic or aqueous-alcoholic alkali medium is also continuously charged thereto through separate means, having been premixed prior to entry into said reactor. Alternatively, an aqueous alkali solution and the alcohol may be charged to the reactor through separate lines or, if so desired, one or both may be admixed with the sulfonic acid or salt thereof prior to entry into said reactor and the mixture charged thereto in a single stream. After a predetermined residence time has elapsed, the reactor effluent is continuously discharged from the reaction zone and subjected to a separation step whereby the desired alcohol is separated from unreacted charge stock, alcoholic alkali medium and any by-product which may have formed, the former two components being recycled to the reaction zone to form a portion of the feed stock.

The following examples are given to illustrate the process of the present invention. They are not, however, intended to limit the generally broad scope of the present invention in strict accordance therewith.

EXAMPLE I

In this example 0.05 moles of sodium dodecanesulfonate, 0.2 mole of sodium hydroxide and 150 cc. of absolute ethyl alcohol were placed in the glass liner of a rotating autoclave. The autoclave was sealed and nitrogen pressed in until an initial pressure of 30 atmospheres was reached. The autoclave and contents thereof were heated to a temperature of 150° C. and maintained at a temperature of from 150° to 200° C. for a period of 5 hours. At the end of this time, the autoclave and contents thereof were allowed to return to room temperature and the autoclave was vented to remove excess pressure. The reaction product was removed from the autoclave and the unreacted sulfonate was filtered off. The filtrate was distilled to remove the solvent and the residue was diluted with water. The alkaline solution was extracted with ether following which the ether was removed by a vacuum and the residue fractionated by distillation. Analysis of certain fractions by means of Gas Liquid Chromatography (GLC), Nuclear Magnetic Resonance (NMR) and Infra Red (IR) showed that n-dodecyl alcohol was obtained in good yield.

EXAMPLES II

A mixture of 0.05 moles of sodium n-dodecanesulfonate, 0.2 mole of sodium hydroxide and 150 cc. of an aqueous alcoholic solution containing 91 wt. percent ethyl alcohol and 9 wt. percent water was placed in the glass liner of a rotating autoclave. The autoclave was sealed and nitrogen pressed in until an initial pressure of 30 atmospheres was reached. The autoclave and contents thereof were then heated to a temperature of 150° C. and maintained at a range of from 150° to 200° C. for a period of 5 hours. Following the completion of the residence time the autoclave and contents thereof were allowed to return to room temperature. After venting the autoclave to remove excess pressure, the reaction product was removed therefrom and the unreacted sulfonate was filtered off. The filtrate was treated in a manner similar to that set forth in Example I above. Analysis of certain fractions by means of GLC, NMR and IR disclosed the presence of a good yield of n-dodecyl alcohol.

EXAMPLE III

A mixture of 0.1 mole of potassium n-decanesulfonate, 0.2 mole of potassium hydroxide and 100 cc. of absolute ethyl alcohol is placed in the glass liner of a rotating autoclave. The autoclave is then sealed and nitrogen is pressed in until an initial pressure of 30 atmospheres is reached. The autoclave is heated to a temperature of about 175° C. and maintained thereat for a period of 5 hours. At the end of this time the autoclave and contents thereof are allowed to cool to room temperature and excess pressure is vented. The reaction product is recovered and treated in a manner similar to that set forth in Example I above. Analysis of the product by means of GLC, NMR and IR will disclose the presence of n-decyl alcohol.

EXAMPLE IV

In this example a mixture of 0.1 mole of 2-methyl-2-propanesulfonic acid, 0.2 mole of sodium hydroxide and 150 cc. of absolute ethyl alcohol is placed in the glass liner of a rotating autoclave which is thereafter sealed and nitrogen pressed in until a superatmospheric pressure of 25 atmospheres is reached. The autoclave is then heated to a temperature of about 150° C. and maintained thereat for a period of 5 hours. After cooling and venting the autoclave, the reaction mixture is recovered and treated in a manner similar to that set forth in Example I above. Distillation will yield t-butyl alcohol.

EXAMPLE V

A mixture of magnesium 2-pentanesulfonate, potassium hydroxide and absolute ethyl alcohol is placed in the glass liner of a rotating autoclave where it is treated in the manner similar to that set forth in the examples above. After recovery of the reaction mixture and work-up in the above-described manner, 2-pentanol will be obtained.

EXAMPLE VI

A mixture of 0.1 mole of phenylmethanesulfonic acid, 0.2 mole of potassium hydroxide and 150 cc. of ethyl alcohol is placed in the glass liner of a rotating autoclave which is thereafter sealed and nitrogen is pressed in until an initial pressure of 25 atmospheres is reached and the autoclave is heated to a temperature of about 150° C. The autoclave is maintained at a temperature ranging from 150° C. to about 200° C. for a period of 5 hours. At the end of this time the autoclave and contents thereof are allowed to cool to room temperature and the excess pressure is vented. The autoclave is opened and the reaction product is removed, filtered, and the filtrate is treated as was that described in Example I. Benzyl alcohol will be obtained.

We claim as our invention:

1. A process for the preparation of an alcohol by subjecting an alkanesulfonic acid or an alkali, alkaline earth or Group III metal salt thereof to hydrolysis, at a temperature of about 100° to about 300° C. and a pressure sufficient to maintain a major portion of the reactants in the liquid phase, in an alcoholic alkali medium containing from about 10 wt. percent to about 70 wt. percent of alkali selected from the group consisting of alkali metal hydroxide and alkaline earth metal hydroxides and in which medium the alcohol is selected from the group consisting of anhydrous lower alkanols and aqueous lower alkanols containing up to about 50% water.

2. The process as set forth in claim 1, further characterized in that said alcoholic alkali medium contains up to 50% water.

3. The process as set forth in claim 1, further characterized in that said alcoholic alkali medium comprises a sodium hydroxide-ethyl alcohol solution.

4. The process as set forth in claim 1, further characterized in that said alcoholic alkali medium comprises a sodium hydroxide-propyl alcohol solution.

5. The process as set forth in claim 1, further characterized in that said alcoholic alkali medium comprises a potassium hydroxide-ethyl alcohol solution.

6. The process as set forth in claim 1, further characterized in that said alkanesulfonic acid salt is sodium n-dodecanesulfonate and said alcohol comprises n-dodecyl alcohol.

7. The process as set forth in claim 1, further characterized in that said alkanesulfonic acid salt is potassium decanesulfonate and said alcohol comprises n-decyl alcohol.

8. The process as set forth in claim 1, further characterized in that said alkanesulfonic acid is 2-methyl-2-propanesulfonic acid and said alcohol comprises t-butyl alcohol.

9. The process as set forth in claim 1, further characterized in that said alkanesulfonic acid salt is magnesium 2-pentanesulfonate and said alcohol comprises 2-pentyl alcohol.

References Cited
UNITED STATES PATENTS

| | | | |
|---|---|---|---|
| 2,553,576 | 5/1951 | Grosse et al. | 260—632 |
| 2,760,992 | 8/1956 | Schoeffel et al. | 260—628 |
| 2,956,026 | 10/1960 | Lew | 252—161 |
| 2,970,964 | 2/1961 | Krumrei et al. | 252—161 |
| 3,027,223 | 3/1962 | Teot | 252—156 |
| 3,422,021 | 1/1969 | Roy | 252—161 |

LEON ZITVER, Primary Examiner

J. E. EVANS, Assistant Examiner

U.S. Cl. X.R.

260—617, 618, 619, 628, 131, 643